(12) United States Patent
Nazarali et al.

(10) Patent No.: US 12,079,746 B2
(45) Date of Patent: Sep. 3, 2024

(54) COLLABORATIVE WORKFLOW CONTROL

(71) Applicant: NCR Voyix Corporation, Atlanta, GA (US)

(72) Inventors: Nazmu M. Nazarali, Waterloo (CA); Rhonda Lee Henderson, Kitchener (CA); Craig Steven Miller, Kitchener (CA); Saptak Arun Neve, Kitchener (CA)

(73) Assignee: NCR Voyix Corporation, Atlanta, GA (US)

( * ) Notice: Subject to any disclaimer, the term of this patent is extended or adjusted under 35 U.S.C. 154(b) by 404 days.

(21) Appl. No.: 17/122,250

(22) Filed: Dec. 15, 2020

(65) Prior Publication Data
US 2022/0188740 A1     Jun. 16, 2022

(51) Int. Cl.
*G06Q 10/0631* (2023.01)
*G06Q 10/0633* (2023.01)
*G06Q 10/107* (2023.01)

(52) U.S. Cl.
CPC .  *G06Q 10/063116* (2013.01); *G06Q 10/0633* (2013.01); *G06Q 10/107* (2013.01)

(58) Field of Classification Search
None
See application file for complete search history.

(56) References Cited

U.S. PATENT DOCUMENTS

| | | | |
|---|---|---|---|
| 7,062,532 B1* | 6/2006 | Sweat | G06Q 10/10 709/225 |
| 2005/0097440 A1* | 5/2005 | Lusk | G06Q 10/10 715/752 |

OTHER PUBLICATIONS

Ogundey, Websocket in Real Time Application, 2019, The Nigerian Journal of Technology (NIJOTECH), vol. 38, No. 4, 2019 (Year: 2019).*
C.Gadea, B.IonescuandD.Ionescu, "NewAlgorithmsandMethodsforCollaborativeCo-EditingUsingHTMLDOM Synchronization," 2018IEEE4thInternationalConferenceonCollaborationandInternetComputing(CIC), Philadelphia, PA, USA, 2018,pp. 217-226, doi: 10.1109/CIC.2018.00038. (Year: 2018).*
Npl—Gadea (Year: 2018).*

* cited by examiner

*Primary Examiner* — Rutao Wu
*Assistant Examiner* — Zahra Elkassabgi
(74) *Attorney, Agent, or Firm* — Schwegman Lundberg & Woessner, P.A.

(57) ABSTRACT

A distributed collaboration interface interacts with a workflow system. A job of the workflow system comprises a series of tasks. Each task of a single job may be performed via the collaboration interface by multiple principals. When a first principal is performing a first task of the job through a first instance of the distributed collaboration interface, second principals performing second tasks of the job may view but may not modify the first task. Moreover, second instances of the distributed collaboration interface associated with the second principals update in real time to lock the first task from being modified by the second principals as soon as the first principal obtains control of the first task within the first instance of the collaboration interface.

5 Claims, 4 Drawing Sheets

LOGGED IN AS USER #1

JOB J TASK X

THE TASK YOU ARE VIEWING IS BEING VIEWED BY USER #2 ANY CHANGES MADE BY YOU MAY BE OVERWRITTEN BY USER #2 AFTER YOU RELEASE THIS TASK

CHECK IMAGE FOR X

EDITING FIELDS ENABLED FOR DETAIL A

| TASK ID | TASK TYPE | DETAIL |
|---|---|---|
| X | CHECK | A |
| Y | CHECK | B |
| Z | CHECK | C |

LOGGED IN AS USER #2

JOB J TASK X

THE TASK YOU ARE VIEWING IS BEING WORKED ON BY USER #1. YOU MAY WORK ON THIS TASK AFTER USER #1 RELEASES IT

CHECK IMAGE FOR X

EDITING FIELDS DISABLED AND GREYED OUT FOR DETAIL A

| TASK ID | TASK TYPE | DETAIL |
|---|---|---|
| X (LOCKED) | CHECK | A |
| Y | CHECK | B |
| Z | CHECK | C |

COLLABORATIVE WORKFLOW CONTROL

BACKGROUND

Many backend enterprise systems permit distributed access to users who simultaneously access resources of the backend systems over network connections. However, tight workflow controls are placed on any of the users when resource changes are being made. Distributed resource viewing is commonplace but distributed resource editing is tightly controlled.

Usually, an enterprise system defines a unit of work within a workflow (a process flow authorized to make resource changes) as a job. Typically, there is a one-to-one correspondence between a job and a user (only one job is assigned to one user at any given point in time) and collaboration is not allowed. This ensures the integrity of the resources maintained within the backend systems and provides a proper audit trail back to a single user should any issues subsequently arise with a given job or resource.

The level of granularity defined for a job is often far too restrictive for many enterprises. A single job may entail tasks requiring one or more users with specialized authorities to approve those tasks; as a result, the user originally assigned to the job may lack the necessary authority to independently complete many tasks of the job. In this case, the job must be relinquished by the assigned user and control given to each authorized user (one at a time) until all tasks for the job are completed.

Moreover, a single job may entail a large number of tasks; such that the job may better suited to be assigned to multiple users in the interest of completing the job more quickly than could be completed by a single user. Further, some tasks of a job may be better suited to particular users with more experience or skill in those particular tasks while other tasks of that job could be handled by lower skilled or less experienced users.

SUMMARY

In various embodiments, methods and a system for collaborative workflow control are provided.

According to an aspect, a method for collaborative workflow control is presented. A first principal associated with a job of a workflow is identified in a first network connection. A second principal associated with the job is identified in a second network connection. A first real-time message is received from a first instance of a collaboration interface operated by the first principal over the first network connection indicating a task of the job was selected for an action by the first principal. A second real-time message is sent to a second instance of the collaboration interface operated by the second principal over the second network connection indicating the task of the job is locked for the action by the first principal and unavailable for modification by the second principal within the second instance of the collaboration interface.

DETAILED DESCRIPTION

Figure 1A:
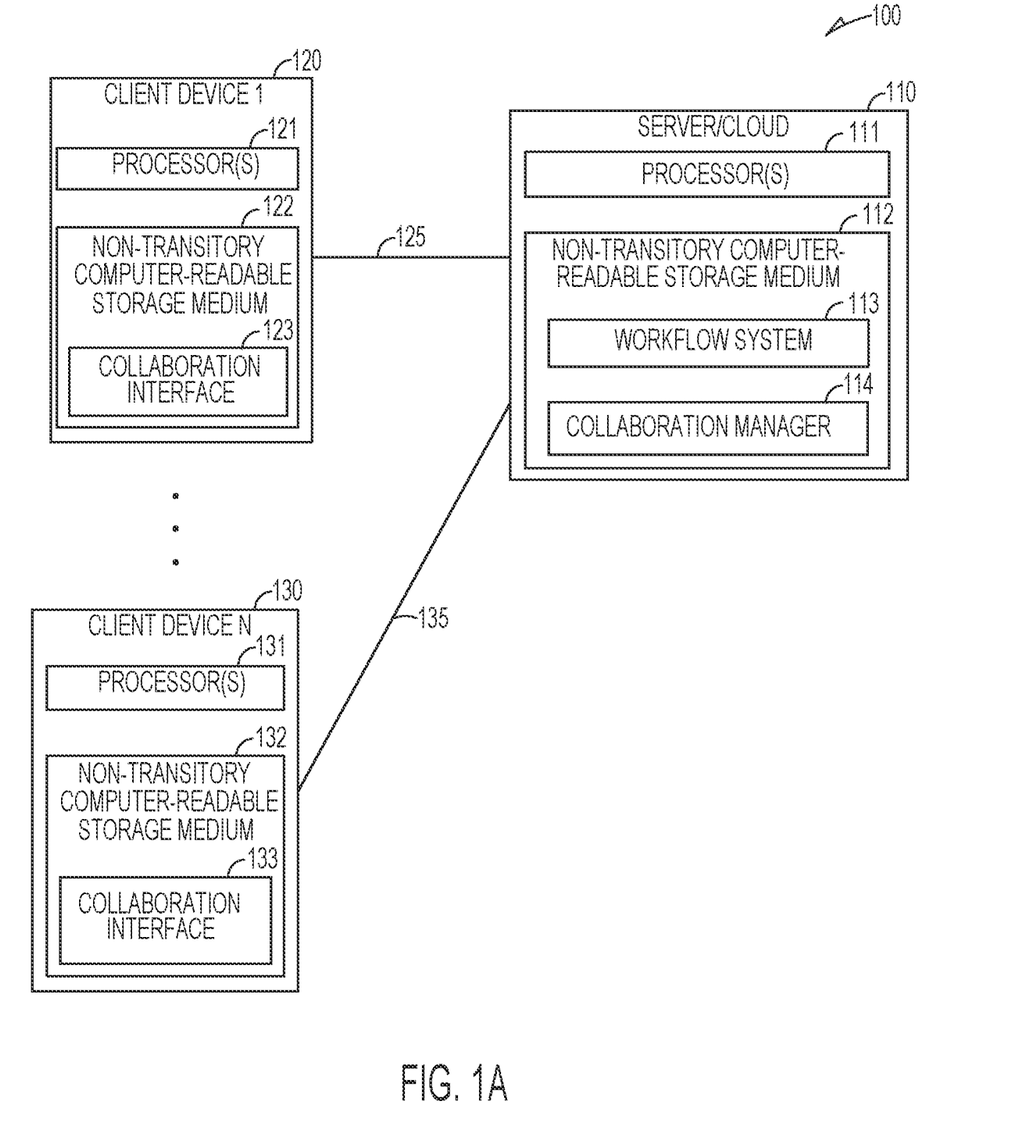
FIG. 1A is a diagram of a system for collaborative workflow control, according to an example embodiment.

FIG. 1A is a diagram of a system 100A for collaborative workflow control, according to an example embodiment. It is to be noted that the components are shown schematically in greatly simplified form, with only those components relevant to understanding of the embodiments being illustrated.

Furthermore, the various components (that are identified in the FIG. 1A) are illustrated and the arrangement of the components is presented for purposes of illustration only. It is to be noted that other arrangements with more or with less components are possible without departing from the teachings of collaborative workflow control, presented herein and below.

As will be demonstrated more completely herein, system 100 provides collaboration workflow control for managing intra-job tasks between principals who are simultaneously performing a single job's tasks via individual instances of a distributed collaboration interface over network connections to a workflow system. Each instance of the distributed collaboration interface provides real-time notification to other instances of the distributed collaboration interface when a given task of a job is selected by a given principal. The instances of the distributed collaboration interface, which are not associated with the selection of the given task, receive the real-time notification and prevent the principals associated with the instances of the distributed collaboration interface from modifying the given task. The instances of the distributed collaboration interface also send real-time inter-interface messages to indicate when tasks of a given job have been released and when the tasks have been modified by one of the instances, which permits all of the instances to collaborate on the tasks of the job without task modification conflicts. This ensures that the integrity of task modifications are controlled within the workflow system when each of the tasks for a single job are being collaborated on by multiple principals associated with multiple instances of the distributed collaboration interface.

As used herein, the term "principal" refers to a user or an automated program that performs actions on tasks of a job within a workflow system.

A "job" is defined by a given workflow (set of processing actions) within the workflow system. A job comprises one or more tasks. Each task may comprise a single action or a set of actions defined in a sub-workflow for its associated job workflow. Each task may comprise attribute values, setting values, and may be associated with a given security role. Furthermore, the security role of a task may be dynamically set based on a particular task's assigned attribute values or assigned setting values.

System 100 may be deployed in a variety of workflow systems 113 to realize the beneficial teachings of collaboration workflow control taught herein. One such workflow system 113 is a financial institution's deposit validation workflow system 113, which is described below as an illustration for comprehending the teachings presented within the context of FIGS. 1A, 1B, and 1C, but which should not be construed as limiting the teachings exclusively to the illustrated deposit validation workflow system 113.

System 100 comprises a server/cloud 110 and client device 1 120 through client device N 130 (N any integer value greater than 2.

Server/cloud 110 comprises one or more processors 111 and a non-transitory computer-readable storage medium 112. Medium 112 comprises executable instructions for workflow system 113 and collaboration manager 114. The executable instructions when executed by processor 111 from medium 112 cause processor 111 to perform operations, which are discussed herein and below with respect to workflow system 113 and collaboration manager 114.

Client device 1 120 comprises one or more processors 121 and a non-transitory computer-readable storage medium 122. Medium 122 comprises executable instructions for a collaboration interface 123 (may also be referred to as "instance of a collaboration interface 123" or "collaboration interface instance 123" herein). The executable instructions when executed by processor 121 from medium 122 cause processor 121 to perform operations, which are discussed herein and below with respect to collaboration interface 123.

Client device N 130 comprises one or more processors 131 and a non-transitory computer-readable storage medium 132. Medium 132 comprises executable instructions for a collaboration interface 133 (may also be referred to as "instance of a collaboration interface 133" or "collaboration interface instance 133" herein). The executable instructions when executed by processor 131 from medium 132 cause processor 131 to perform operations, which are discussed herein and below with respect to collaboration interface 133.

The components of system 100 are now discussed for purposes of illustration and comprehension only within the context of deposit validation workflow system 113 with principals who are users rather then principals that are automated programs (note that when principals are automated programs collaboration interfaces 123 and 133 may comprise Application Programming Interfaces (APIs) that permit automated interaction with collaboration manager 114 and workflow system 113).

Initially, a first user (first principal) operating client device 1 120 logs into and authenticates for access to deposit validation workflow system 113 over a first network connection 125.

In an embodiment, collaboration manager 114 may host an instance of collaboration interface 123 on behalf of client device 1 120 during the first network connection 125 (such through a web browser and hosted and served web pages associated with the instance of collaboration interface 123). The first network connection 125 may be wired, wireless, or a combination of wired and wireless.

In an embodiment, workflow system 113 hosts instances of the collaboration interfaces 123 and 133 (through a web browser and hosted and served web pages associated with the instances 123 and 133).

The first user interacts with the instance of the collaboration interface 123 to access deposit validation workflow system 113 and checkout or obtain a deposit job requiring validation for a plurality of check deposits for the single deposit job. Each task of the deposit job may require a variety of actions by the first user, such as validating Magnetic Ink Character Recognition (MICR) was translated properly for the MICR line on the corresponding check, validating signatures, validating a deposit amount appearing in an image of the corresponding check matches the keyed deposit amount, validating account information for the corresponding check, validating the payee and payor information for the corresponding check, and obtaining appropriate supervisory approval for any check of the deposit that exceeds a predefined dollar amount. It is noted that tasks may also include other actions required by the financial institution associated with deposit validation workflow system 113 and defined in the sub-workflows for the tasks or the deposit job workflow for the deposit job.

The corresponding attribute values for each check in the deposit job are obtained by collaboration manager 114 from deposit validation workflow system 113 and rendered with interface options within the instance of collaboration interface 123 for user selections and actions via the interface options in order to complete tasks (proper validations and/or corrections on the checks of the deposit job). An image of each check associated with the deposit is also rendered within the instance of the collaboration interface 123 when the first user selects any given check for performing actions associated with validation tasks on the selected check.

Identifiers, fields, and values associated with each check of the deposit job and selected interface options made by the first user are also maintained within the instance of collaboration interface 123 within memory on client device 1 120 as a Document Object Model (DOM) object.

Instance of collaboration interface 123 monitors the DOM object for any selection of a given check associated with the deposit job when a selection is made to a task or a set of tasks associated with a given check, a lock message is sent over connection 125 to collaboration manager 114 along with a first user identifier for the first user, a deposit job identifier for the deposit job, and an item/task identifier for the selected check. Collaboration manager 114 broadcasts the lock message with the first user identifier, the deposit job identifier, and the item task identifier to each additional client device (such as client device N 130) that has a connection (such as connection 135) and that is known to collaboration manager 114 to have checked out the same deposit job (based on user identifiers and deposit job identifiers).

Client device N 130 receives the lock message, first user identifier, deposit job identifier, and item/task identifier over connection 135 (wired, wireless, or a combination of wired and wireless) from collaboration manager 114. This causes instance of collaboration interface 133 on client device N 130 to disable interface options associated with editing the item/task identifier (check being validated by first user of client device 1 120) within instance of collaboration interface 133 and render visual cues within the instanced of collaboration interface 133 indicating to a second collaborating user operating client device N 130 that a given listed check in the deposit job is currently locked and cannot have modification and validation actions performed by the second user until the first user releases the lock. Again, instance of collaboration interface 133 on device N 130 maintains a DOM object for the deposit job and the interface options, such that notification and locking down of editing options within the instance of the collaboration interface 133 can be performed in real time as soon as the lock message is received from collaboration manager 114 over connection 135.

Additionally, any sequential navigating or browsing of the checks (tasks or items) for the job available within instance of collaboration interface 133 can be skipped or bypassed because of the lock on those tasks or items.

Still further, the first user identifier that has the lock on the given check (task) may be displayed to the second collaborating user in real time within the instance of collaboration interface 133. The data associated with the locked task or check for the deposit job may still be viewed within the instance of the collaboration interface 133 but options associated with editing, modifying, and validating the attribute values of the check or task are greyed out and disabled for the second user while the lock remains on the task/check of the deposit job.

In an embodiment, as the first user modifies attribute values on the locked check/task within the instance of collaboration interface 123, the modified values are sent in real time to collaboration manager 114 and broadcasts to all client devices N 130 that current have the deposit job loaded within their instances of collaboration interface 133. This permits real-time viewing of modifications made by first user to be viewed by all second collaborating second users within their instances of collaboration interface 133. Again, this is achieved via real-time messages sent over connections 125 and 135 and via real-time management of the corresponding DOM objects by each instance of collaboration interface (123 and 133).

In an embodiment, each rendered interface page or screen within the instances of the collaboration interfaces (123 and 133) includes a notes or comments field, which is part of each user's monitored DOM object. The notes or comments field may be used as real-time messaging between collaborating users working on a same deposit job simultaneously. As a sending user sends a written text communication message within the notes or comments field, the typed message is viewable to the other listening users. This further permits real-time collaboration between the users on a same deposit job.

The first user may commit changes made to a selected and locked task through an update or commit option within instance of collaboration interface 123. This causes collaboration manager 114 to update workflow system 113 with the changes associated with the task and release the lock from the task.

The first user may also elect not to commit the changes and release the lock for the task through a release lock option, which causes a release lock message to be broadcasted to each of the second collaborating users and allows any of the second collaborating users to select the task associated with the previous lock causing one of the second collaborating users to obtain the lock on the task.

Collaboration manager 114 maintains lists of user identifiers that have checked out a same deposit job for performing the tasks of that deposit job. Each list allows collaboration manager 114 to properly broadcast the real-time messages about selected tasks, locks, releases on locks, notes/comments, and changes in attribute values for modified tasks to the proper users affected by actions in the workflow being performed by the users on the deposit job.

In an embodiment, connections 125 and 135 are browser-based web socket connections to server/cloud 110 permitting real-time two-way communication between server/cloud 110 and the client devices 120 and 130. That is, the messages are sent upon detected DOM changes in real time using web socket connections 125 and 135 without the users being required to refresh the browser or select a designated interface option. As soon as changes in the DOM object are detected messages and the corresponding information (locks, release of locks, notes/comments, modified task attribute values, etc.) are broadcast by collaboration manager 114 to all the corresponding collaborating users for real time reflection and rendering within their instances of collaboration interface 123 and 133).

Figure 1B:
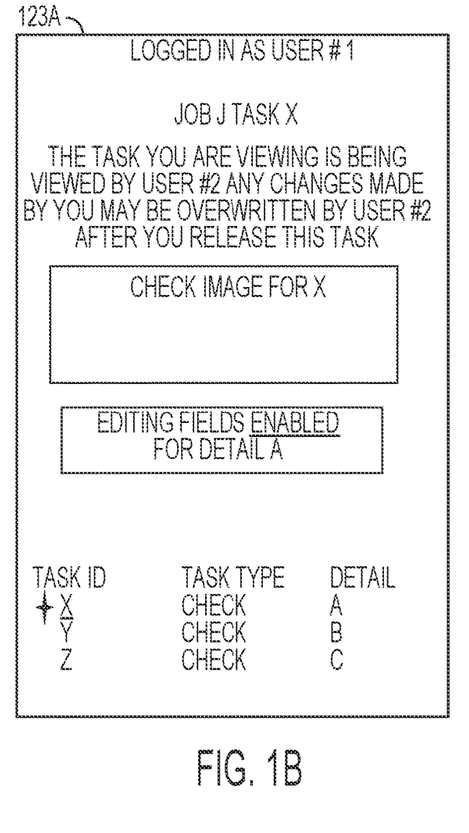
FIGS. 1B and 1C are diagrams illustrating sample screen shots rendered by a collaborative interface associated with the system of FIG. 1A, according to an example embodiment.
Figure 1C:
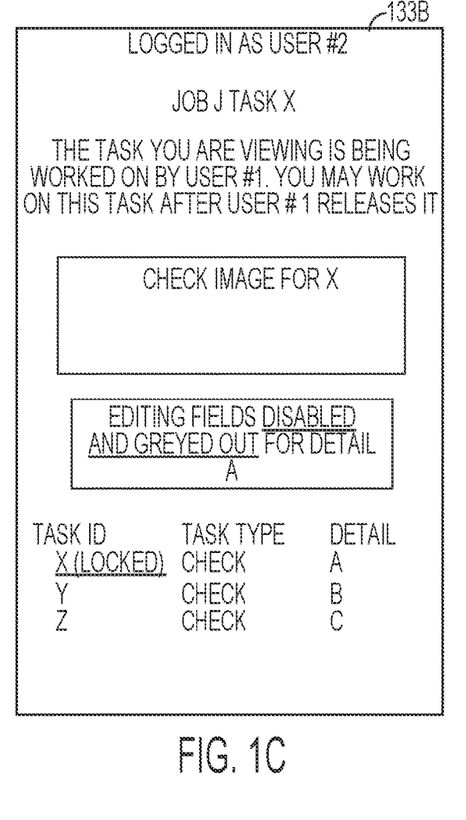

FIGS. 1B and 1C are diagrams illustrating sample screen shots rendered by a collaborative editing interface associated with the system of FIG. 1A, according to an example embodiment.

Screen shot 123A illustrates a first user (user #1) logged into collaboration manager 114 and/or workflow system 113. User #1 has checkout job J and has selected task X within the interface options having a task type of check and check details (attribute values) of A. Screen shot 123A shows that user #1 has checkout Job J and selected task X along with other tasks associated with job J (tasks/checks Y and Z); under task ID task/check X is starred, underlined, and bolded. Screen shot 123A also has loaded the image of check/task X and enabled for editing check details A.

Simultaneously, as shown in screen shot 133B, a second concurrent user (user #2) has also selected Job J and check/task X. However, in screen shot 133B, the task ID for task X is bolded, underlined, and includes a locked designation on it; and details A for check X is displayed but greyed out, such that user #2 is unable to make any changes to detail A for check X.

Both screen shots 123A and 133B may render a warning that another user (along with the specific user identifier) is reviewing job J and task/check X simultaneously, such that any changes made to task X by user #1 may be overwritten by user #2 after user #1 releases task X (shown in screen shot 123A to user #1) and task X may be worked on by user #2 after user #1 releases it (shown in screen shot 133B to user #2).

Although not shown in screen shots 123A and 133B, a real-time notes or comments field may also be rendered in the screen shots 123A and 133B permitting the two users (user #1 and user #2) to message one another in real time regarding job J and/or task/check X.

These and other embodiments will now be discussed with reference to FIGS. 2-3.

Figure 2:
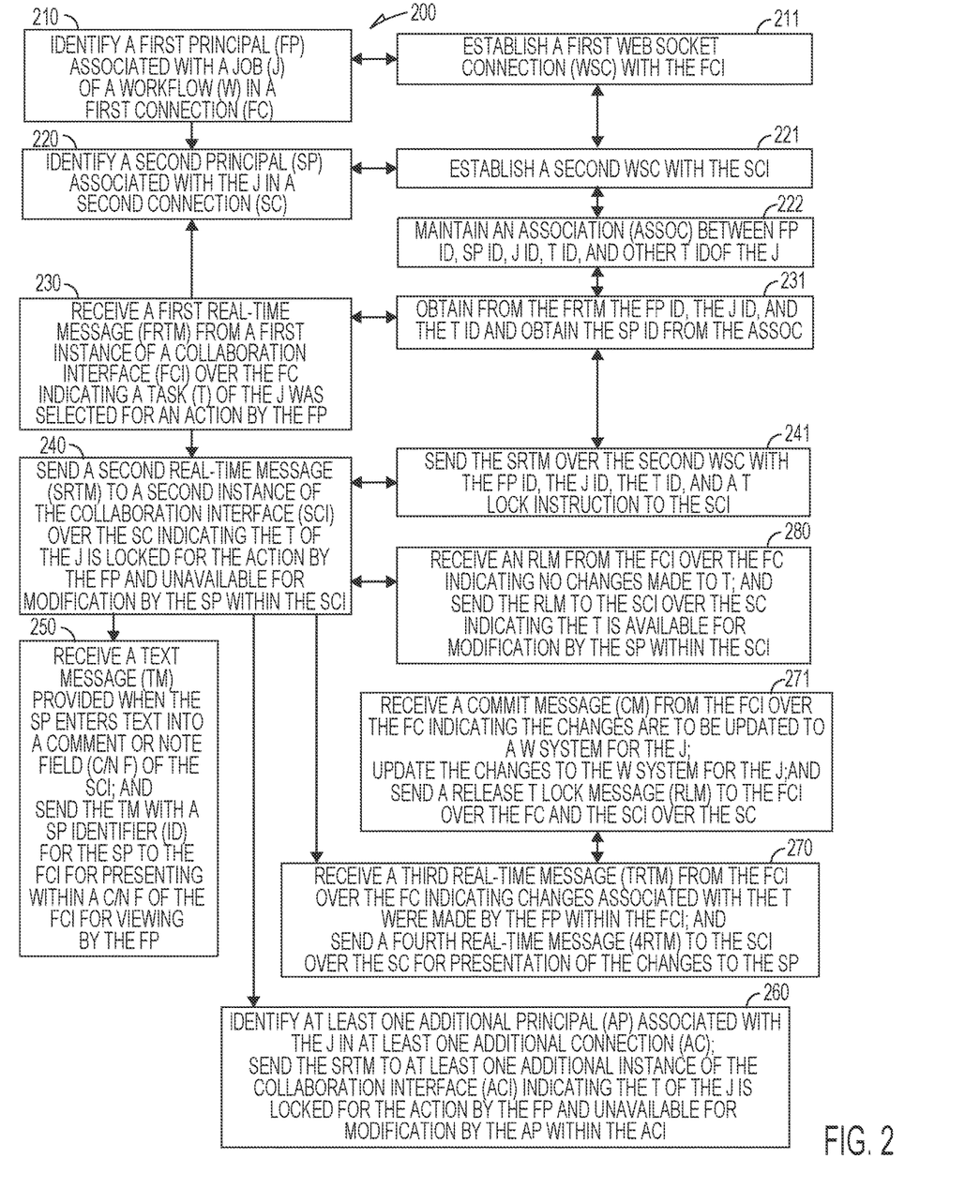
FIG. 2 is a diagram of a method for collaborative workflow control, according to an example embodiment.

FIG. 2 is a diagram of a method 200 for collaborative workflow control, according to an example embodiment. The software module(s) that implements the method 200 is referred to as a "collaboration control manager." The collaboration control manager is implemented as executable instructions programmed and residing within memory and/or a non-transitory computer-readable (processor-readable) storage medium and executed by one or more processors of a device. The processor(s) of the device that executes the collaboration control manager are specifically configured and programmed to process the collaboration control manager. The collaboration control manager may have access to one or more network connections during its processing. The network connections can be wired, wireless, or a combination of wired and wireless.

In an embodiment, the device that executes the collaboration control manager is server 110. In an embodiment, the server 110 is a cloud-based processing environment comprising a collection of physical servers cooperating as a single logical server (a cloud 110).

In an embodiment, the collaboration control manager is all of or some combination of collaboration manager 114 and/or workflow system 113.

At 210, the collaboration control manager identifies a first principal associated with a job of a workflow in a first network connection.

In an embodiment, at 211, the collaboration control manager establishes a first web socket connection with a first instance of a collaboration interface associated with the first principal.

At 220, the collaboration control manager identifies a second principal associated with the job in a second network connection.

In an embodiment of 211 and 220, at 221, the collaboration control manager establishes a second web socket connection with a second instance of the collaboration interface associated with the second principal.

In an embodiment of 221 and at 222, the collaboration control manager maintains an association (mapping, table, list, etc.) between a first principal identifier for the first principal, a second principal identifier for the second principal, a job identifier for the job, a task identifier for the task of the job, and other task identifiers for other tasks of the job.

At 230, the collaboration control manager receives a first real-time message from the first instance of the collaboration interface over the first network connection indicating a task of the job was selected for an action by the first principal.

In an embodiment of 222 and 230, at 231, the collaboration control manager obtains from the first real-time message, the first principal identifier for the first principal, the job identifier for the job, and the task identifier for the task. The collaboration control manager obtains the second principal identifier for the second principal from the association.

At 240, the collaboration control manager sends a second real-time message to a second instance of the collaboration interface associated with the second principal over the second network connection. The second real-time message indicates that the task of the job is locked for action by the first principal and that the task is unavailable for modification by the second principal within the second instance of the collaboration interface.

In an embodiment of 231 and 240, at 241, the collaboration control manager sends the second real-time message over the second web sockets connection with the first principal identifier for the first principal, the job identifier for the job, the task identifier for the task, and a task lock instruction for the second instance of the collaboration interface to place a lock on the task within the second instance of the collaboration interface.

In an embodiment, at 250, the collaboration control manager receives a text message provided when the second principal enters text into a comment or note field of the second instance of the collaboration interface. The collaboration control manager sends the text message with the second principal identifier for the second principal to the first instance of the collaboration interface for presenting to the first principal for viewing.

In an embodiment, at 260, the collaboration control manager identifies at least one additional principal associated with the job in at least one additional network connection. The collaboration control manager sends the second real-time message to at least one additional instance of the collaboration interface indicating that the task of the job is locked for the action by the first principal and is unavailable for modification by the additional principal(s) within the additional instance(s) of the collaboration interface.

In an embodiment, at 270, the collaboration control manager receives a third real-time message from the first instance of the collaboration interface over the first network connection indicating changes associated with the task were made by the first principal within the first instance of the collaboration interface. The collaboration control manager sends a fourth real-time message to the second instance of the collaboration interface over the second network connection for presentation of the changes in real time to the second principal.

In an embodiment of 270 and at 271, the collaboration control manager receives a commit message from the first instance of the collaboration interface over the first network connection indicating the changes to the task are to be updated to a workflow system for the job. The collaboration control manager updates the changes to the workflow system for the job and sends a release task lock message for the task to the first instance of the collaboration interface over the first network connection and to the second instance of the collaboration interface over the second network connection.

In an embodiment, at 280, the collaboration control manager receives a release transaction lock message from the first instance of the collaboration interface over the first network connection indicating no changes were made by the first principal to the task. The collaboration control manager sends the release transaction lock message to the second instance of the collaboration interface over the second network connection indicating that the task is available for modification by the second principal within the second instance of the collaboration interface.

Figure 3:
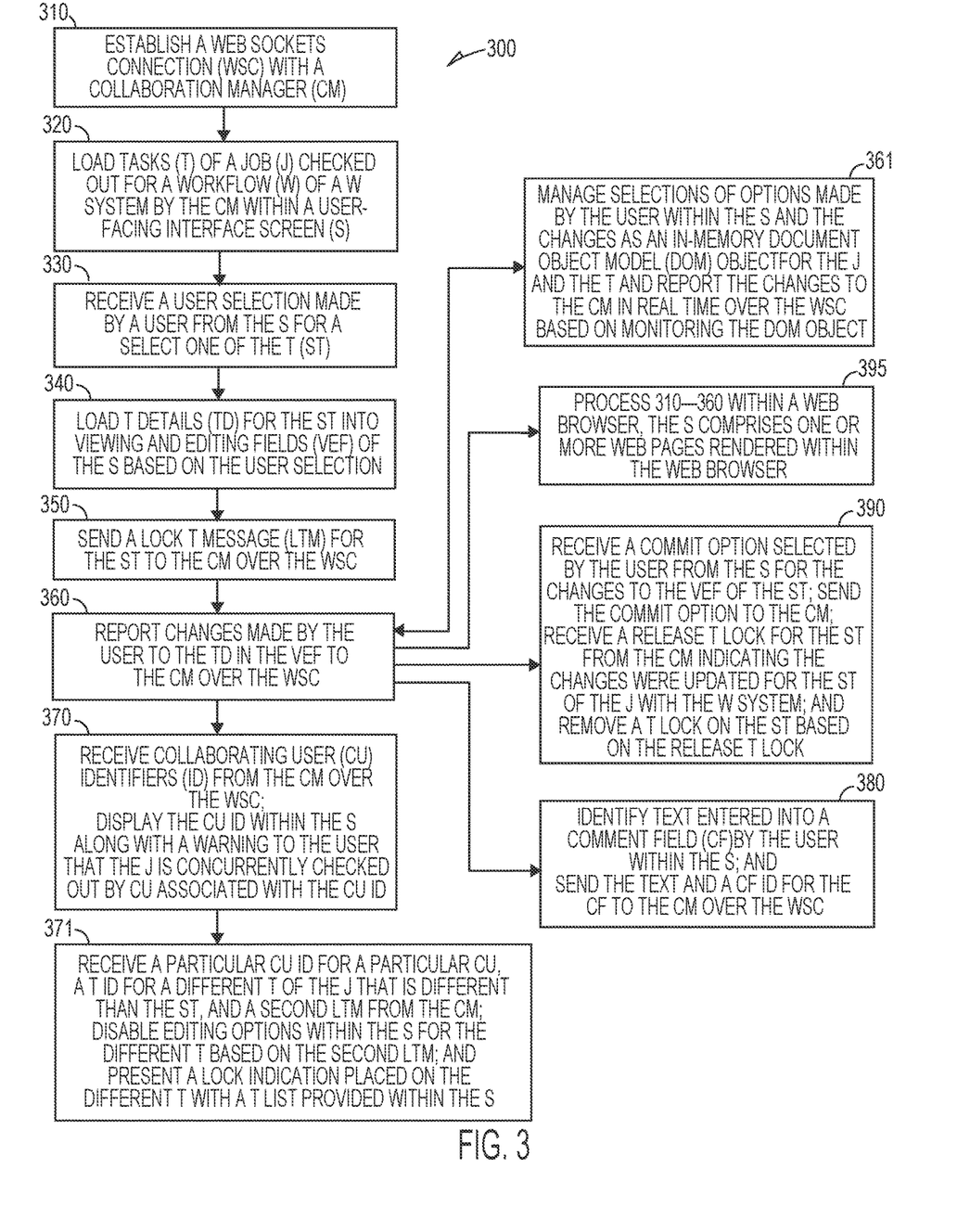
FIG. 3 is a diagram of another method for collaborative workflow control, according to an example embodiment.

FIG. 3 is a diagram of another method 300 for collaborative workflow control, according to an example embodiment. The software module(s) that implements the method 300 is referred to as an "instance of a workflow collaboration interface." The instance of a workflow collaboration interface is implemented as executable instructions programmed and residing within memory and/or a non-transitory computer-readable (processor-readable) storage medium and executed by one or more processors of a device. The processors that execute the instance of a workflow collaboration interface are specifically configured and programmed to process the instance of a workflow collaboration interface. The instance of a workflow collaboration interface may have access to one or more network connections during its processing. The network connections can be wired, wireless, or a combination of wired and wireless.

In an embodiment, the device that execute the instance of a workflow collaboration interface is client device 120 or client device 130. In an embodiment, client device 120 or client device 130 is a laptop, a desktop computer, a phone, a tablet, or a wearable processing device.

In an embodiment, the instance of a workflow collaboration interface is collaboration interface 123 or collaboration interface 133.

The instance of a workflow collaboration interface interacts with method 200 of FIG. 2 to provided collaborative and distributed real-time workflow control for a workflow of a workflow system.

At 310, the instance of a workflow collaboration interface establishes a web sockets connection with a collaboration manager (114 and/or method 200).

At 320, the instance of a workflow collaboration interface loads tasks of a job checked out for a workflow of a workflow system by the collaboration manager within a user-facing interface screen.

At 330, the instance of a workflow collaboration interface receives a user selection made by a user from the user-facing interface screen for a select on of the tasks associated with the job.

At 340, the instance of a workflow collaboration interface loads task details (attribute values) for the select one of the tasks into viewing and editing fields of the user-facing interface screen based on the user selection at 330.

At 350, the instance of a workflow collaboration interface sends a lock task message for the select one of the tasks to the collaboration manager over the web sockets connection.

At 360, the instance of a workflow collaboration interface reports changes made by the user to the task details in the viewing and editing fields to the collaboration manager over the web sockets connection.

In an embodiment, at 361, the instance of a workflow collaboration interface manages selections of interface options made by the user within the user-facing interface screen and the changes made to the viewing and editing fields as an in-memory DOM object for the job and the tasks. The instance of a workflow collaboration interface reports the changes to the collaboration manager in real time over the web sockets connection based on monitoring the DOM object.

In an embodiment, at 370, the instance of a workflow collaboration interface receives one or more collaborating user identifiers from the collaboration manager over the web sockets connection and displays the collaborating user identifiers within user-facing interface screen along with a warning to the user that the job is concurrently checked out by one or more collaborating users associated with the collaborating user identifiers.

In an embodiment of 370 and at 371, the instance of a workflow collaboration interface receives a particular collaborating using identifier for a particular collaborating user, a task identifier for a different task that is different than the select one of the tasks of 330, and a second lock task message from the collaboration manager. The instance of a workflow collaboration interface disables editing options within the user-facing interface screen for the different task based on the second lock task message, and the instance of a workflow collaboration interface presents a lock indication placed on the different task with a task list provided within the user-facing interface screen.

In an embodiment, at 380, the instance of a workflow collaboration interface identifies text entered into a comment field by the user within the user-facing interface screen and the instance of a workflow collaboration interface sends the text and a comment field identifier for the comment field to the collaboration manager over the web socket connection.

In an embodiment, at 390, the instance of a workflow collaboration interface receives a commit option selected by the user from the user-facing interface screen for the changes to the viewing and editing field values of the select one of the tasks. The instance of a workflow collaboration interface sends the commit option to the collaboration manager and receives a release transaction lock for the select one of the tasks back from the collaboration manager indicating that the changes were updated for the select one of the tasks of the job within the workflow system. In response, the instance of a workflow collaboration interface removes a transaction lock on the select one of the tasks based on receipt of the release task lock.

In an embodiment, at 395, the instance of a workflow collaboration interface processes 310-360 (or 310-390) within a web browser. The user-facing interface screen comprises one or more web pages rendered within the web browser of a client device operated by the user.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   establishing, by a user-operated device, a web socket connection with a collaboration manager;
   loading, by the user-operated device, tasks of a job checked out for a workflow of a workflow system by the collaboration manager within a user interface screen, wherein a user interface associated with the user interface screen is hosted by the collaboration manager on a server over the web socket connection, wherein the workflow is a deposit workflow for a deposit;
   receiving, by the user-operated device, a user selection made by a user from the user interface screen for a select one of the tasks;
   loading, by the user-operated device, task details for the select one of the tasks into viewing and editing fields of the user interface screen based on the user selection;
   sending, by the user-operated device, a lock task message for the select one of the tasks to the collaboration manager over the web socket connection;
   reporting, by the user-operated device, changes made by the user to the task details in the viewing and editing fields to the collaboration manager over the web socket connection, wherein reporting further includes managing selections of options made by the user within the user-facing interface screen and the changes as an in-memory Document Object Model (DOM) object for the job and the tasks and reporting the changes to the collaboration manager in real time over the web socket connection based on monitoring the in-memory DOM object; and
   processing, by the user-operated device, the establishing, the loading of the tasks, the receiving, the loading of the task details, the sending, and the reportion as one instance of a plurality of instances of the method executing on other user-operated devices of other users, wherein at least one of the other user-operated devices is associated with a particular user attempting to deposit a check and a hold is placed on the deposit until the deposit workflow completes with the user and the other users not associated with the particular user, wherein the tasks include validating magnetic ink character (MICR) data for the deposit, validating signatures for the deposit, validating a deposit amount for the deposit, validating account information for the deposit, validating payee and payor information for the deposit, and obtaining supervisory approval when the deposit exceeds a predefined amount; and
   receiving, by the user-operated device, a particular collaborating user identifier for a particular collaborating user, a task identifier for a different task of the job that is different from the select one of the tasks, and a second lock task message from the collaboration manager;

disabling, by the user-operated device, editing options within the user interface screen for the different task based on the second lock task message; and presenting, by the user-operated device, a lock indication placed on the different task with a task list provided within the user interface screen.

2. The method of claim 1 further comprising, processing the method within a web browser, wherein the user interface screen comprises one or more web pages rendered within the web browser.

3. The method of claim 1 further comprising:

receiving, by the user-operated device, one or more collaborating user identifiers from the collaboration manager over the web socket connection; and displaying, by the user-operated device, the one or more collaborating user identifiers within the user-interface screen along with a warning to the user that the job is concurrently checked out by one or more collaborating users associated with the one or more collaborating user identifiers.

4. The method of claim 1 further comprising:

identifying, by the user-operated device, text entered into a comment field by the user within the user interface screen; and sending, by the user-operated device, the text and a comment field identifier for the comment field to the collaboration manager over the web socket connection.

5. The method of claim 1 further comprising: receiving, by the user-operated device, a commit option selected by the user from the user interface screen for the changes to the viewing and editing fields of the select one of the tasks; sending, by the user-operated device, the commit option to the collaboration manager; receiving, by the user-operated device, a release task lock for the select one of the tasks from the collaboration manager indicating the changes were updated for the select one of the tasks of the job with the workflow system; and removing, by the user-operated device, a task lock placed on the select one of the tasks based on the release task lock.

\* \* \* \* \*